G. MAYNARD.
Cultivator-Teeth.
No. 24,568. Patented June 28, 1859.
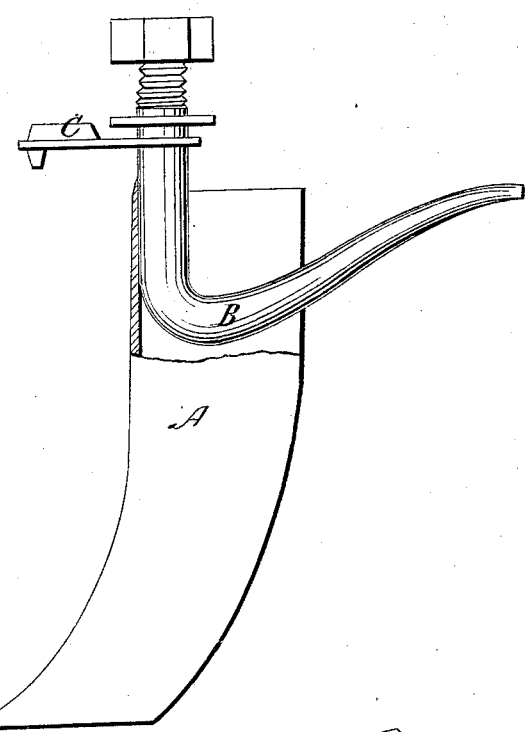
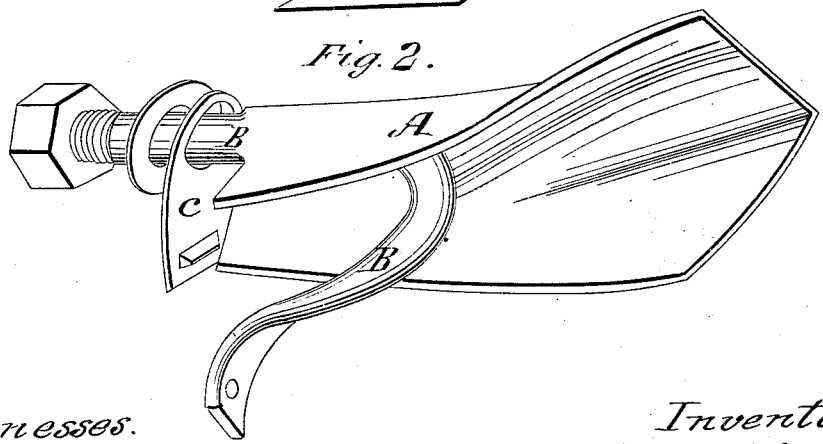
Witnesses.
Benj Thomas
W. H. Thomas
Inventor:
Gardner Maynard

UNITED STATES PATENT OFFICE.

GARDINER MAYNARD, OF ILION, NEW YORK.

IMPROVEMENT IN CULTIVATOR-TEETH.

Specification forming part of Letters Patent No. 24,568, dated June 28, 1859.

*To all whom it may concern:*

Be it known that I, GARDINER MAYNARD, of Ilion, in the county of Herkimer and State of New York, have invented certain new and useful Improvements in Cultivator-Teeth; and I do hereby declare the following to be a full, clear, and exact description of the same, reference being had to the annexed drawings and the letters of reference marked thereon, as forming a part of this specification, similar letters referring to like parts.

To enable others skilled in the art to make and use my invention, I will describe its construction and operation.

In the drawings, Figure 1 is a side elevation, representing the form in which the stem is bent. Fig. 2 is the back of the tooth, also showing the stem and brace and the manner in which it is secured to the frame.

A represents the tooth, which may be constructed substantially the same as the ordinary tooth.

B is the wrought-iron stem, which is bent in the shape shown in the drawings. Said stem is secured to the tooth by means of jaws or arms near the top and on the inner side of the tooth, which are clamped around the stem and welded. On the head of stem B a screw is cut, which enters the frame and is secured by a tap or nut. At the opposite end, which forms the brace, a hole is bored for the insertion of either screw or bolt.

C is a cast or wrought iron stay, with flanges or projections both on the under and upper side, as fully represented in Fig. 1.

It has hitherto been a matter of considerable difficulty to secure cultivator-teeth in such a manner to the frame as would afford an economical and entirely secure plan. The mode which I here propose embraces both of these desirable features, and the practical farmer will readily appreciate the advantages and value which are attached to this mode of securing the tooth to the frame.

I am aware of the rejected case of Patchens and that of Hall, and I am also aware of the patent granted to Stockdale June 3, 1855; hence I disclaim everything shown or represented in any of them; but I do claim—

The arrangement of the tooth A, stay C, and wrought-iron stem and brace B, when the stem is welded between the wings of the tooth and made to form a brace, substantially as set forth, the whole being constructed and used in the manner specified.

GARDINER MAYNARD.

Witnesses:
W. H. THOMAS,
LEVI THOMAS.